United States Patent Office 3,201,335
Patented Aug. 17, 1965

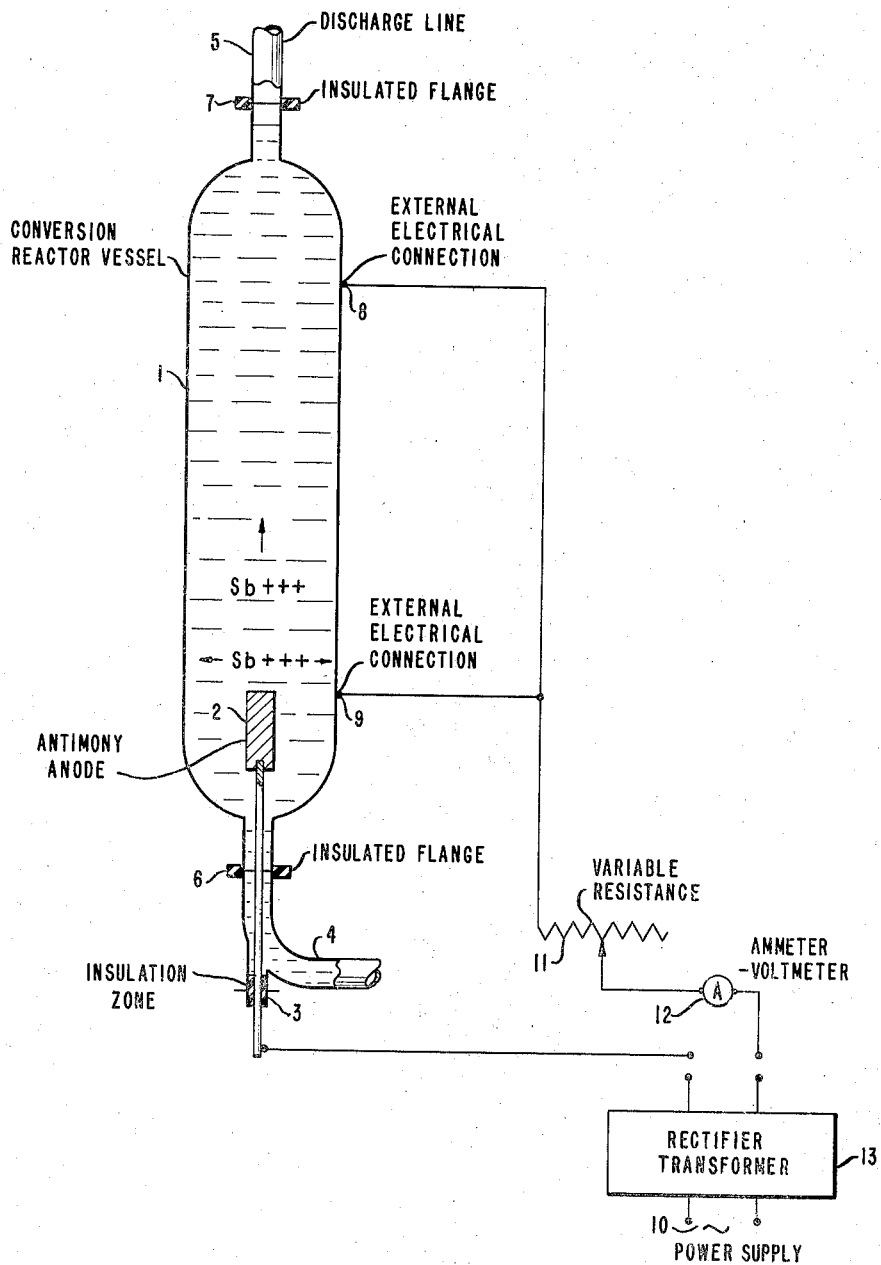

3,201,335
CORROSION PROTECTION
Adrian J. MacNab, Berkeley, and Richard S. Treseder, Oakland, Calif., assignors to Shell Oil Company, New York, N.Y., a corporation of Delaware
Filed Oct. 25, 1962, Ser. No. 233,084
1 Claim. (Cl. 204—147)

This application is a continuation-in-part of copending application Serial No. 171,907, filed February 8, 1962, now abandoned.

This invention relates to corrosion protection of various types of vessels used in conversion processes wherein extensive corrosion is caused by Friedel-Crafts molten salt catalysts employed in the conversion process. More particularly, this invention is directed to the protection of certain types of conversion reactor vessels wherein an aluminum halide catalyst is used.

It is well known that most common and effective catalysts of the Friedel-Crafts type used in conversion reactions such as alkylation, cracking or isomerization are of the aluminum or aluminum and antimony type, such as described in U.S. Patent 2,370,195 to Ross et al., issued February 27, 1945. It is also known that these are liquid and contain an aluminic acid as well as certain amounts of free hydrogen halide, and are therefore exceedingly corrosive, particularly in and around the area of the conversion reaction vessel. Heretofore reactor vessels of this type have been constructed of or lined with nickel and various alloys thereof, for it is known that materials such as cast iron, copper, tin, lead, and even carbon steel are corroded extensively when used in a reactor vessel unless provisions are made for protecting these materials from the highly corrosive catalyst mixtures. Moreover, even when the highly corrosion-resistant materials such as Monel or nickel are used to line the reactor vessel, it is still essential to occasionally (i.e., every six months) shut down the vessel to inspect and repair corroded areas.

The present invention provides a superior means for protecting vessels from corrosion by molten salt contained therein particularly in a conversion process catalyzed by a corrosive molten salt. In accordance with the invention a vessel is protected from corrosion by the molten salt by providing an anode and complete electrical circuit, thereby polarizing the vessel wall and depositing a thin protective film on the surface exposed to the molten salt. Contamination of the catalyst with corrosion products normally produced during the process by corrosion of the vessels is decreased, the operating life of the vessel is increased, and various relatively inexpensive carbon steel vessels, heretofore unsatisfactory, can be used in the process with a significant reduction in cost with respect to capital cost, maintenance and safety. The accompanying drawing is a schematic sectional view of a reaction vessel for use in a conversion process illustrating a preferred embodiment wherein corrosion protection is provided in accordance with the invention.

The characterizing features of the corrosion protection system are (1) an electrolyte, (2) an anode and (3) a cathode. The electrolyte in the instant process is the Friedel-Crafts catalyst or the Friedel-Crafts catalyst and the hydrogen halide material contained in the hydrocarbon. The anode is a block of metal located inside the vessel, whereas the vessel itself serves as the cathode.

When the anode and cathode are two pieces of similar metal, it is necessary to insulate the anode from the cathode and provide a conventional source of impressed current in order to establish the desired difference in potential between the anode and the cathode. An example of such a system would be steel anode and steel vessel. When the anode and cathode are two pieces of unlike metal, it is not necessary to provide an external source of impressed voltage. The anode is coupled directly to the cathode, the difference in electro-chemical potential between the two giving rise to positive and negative ions. An example of such a galvanic system would be steel anode and a nickel lined vessel as the cathode. It can be beneficial in order to gain the maximum corrosion protection to provide an external circuit for an additional source of impressed current in which case the anode and cathode must be separated by electrical insulation.

Examples of suitable electrode combinations for use in this corrosion protection system are:

| Cathode | Anode | Type of Protection |
|---|---|---|
| Steel | Antimony | Impressed current. |
|  | Steel or iron | Do. |
|  | Nickel | Do. |
|  | Platinum | Do. |
|  | Aluminum | Galvanic and/or impressed current. |
| Nickel | Steel or iron | Do. |
|  | Antimony | Impressed current. |
|  | Nickel | Do. |
|  | Platinum | Do. |
|  | Aluminum | Galvanic and/or impressed current. |

Likewise Hastelloy alloy B, manufactured by the Haynes Stellite Company, or stainless steel can be used as the cathode with any of the above anodes. The term steel includes carbon steel (an alloy of iron and from about 0.1 to about 1.5% carbon) and alloy steel wherein one or more of the following metals are added to carbon steel: manganese, nickel, copper, chromium, molybdenum, vanadium, tungsten and cobalt. The term nickel includes both commercial nickel and various alloys thereof which are known to those skilled in the art for vessel fabrication.

When the catalyst system is of the aluminum and antimony type, if the anode is composed of antimony, the instant corrosion protection system can be incorporated into a reactor vessel and maintained during the corrosion reaction without adversely affecting the catalytic activity of the various Friedel-Crafts type catalysts employed. For example, it is well known that in a conversion reaction the loss of aluminum halide complex and the practical difficulties caused by the formation of "sludge" determine the overall effectiveness of the reaction. The formation of salts due to various corrosion processes oftentimes adversely affects the activity of the catalyst medium through the formation of catalyst "sludge" and by disrupting the critical concentration of the various constituents of the catalyst mixture. Therefore, this embodiment of the corrosion protection system which does not alter or adversely affect either the concentrations of these various catalyst salts and complexes or the catalyst themselves is an attractive method of combating reactor vessel corrosion.

More specifically, the instant corrosion protection scheme functions in part by maintaining at the surface of the vessel a continuous negative charge which neutralizes any and all positive ions when they reach the surface, so that they tend to form a continuous protective film on the surface. The formation of this protective film has significant importance on the success of the instant corrosion protection system and is directly related to the amount of current necessary to maintain the instant corrosion protection system during the conversion process.

The continuous charge is maintained at the inner surface of the vessel by either connecting the vessel to some source of energy which is capable of supplying direct current or by using an anode and cathode of two unlike metals. The external source of energy can be a commercial electrical supply of alternating current which is passed through a rectifier and transformer. The amount of current necessary to maintain this continual negative charge on the vessel surface is determined by a number of factors which can be determined experimentally and which will be subsequently discussed. In a preferred embodiment of the invention, the current is supplied to the vessel in a pulsating manner. That is, there are extended periods wherein there is no current passed to the vessel and the antimony film itself provides the protection required.

The following examples are illustrative of some of the advantages derived from the invention, but are not to be considered to limit the scope of the invention:

EXAMPLE I

Two identical carbon steel specimens, approximately 2 inches x ¼ inch x ¹⁄₁₆ inch, were tack-welded to suitable lengths of nickel wire and immersed in a molten salt (89% SbCl₃ 11% AlCl₃) mixture which was then blanketed with anhydrous HCl. The glass vessel containing the salt mixture was stoppered by standard ground glass fittings through which platinum wires penetrated for external electrical contact. Included in the cell was antimony anode, an antimony reference electrode and a nickel control specimen. One of the carbon steel specimens also acted as a control. The specimens and attached wires were accurately weighed before placing in the solution, which was kept fluid by low heat and maintained at 94° C. throughout, and were weighed after cleaning at the end of the test. The weight losses, which indicate the extent of attack, are set forth in Table I below.

*Table I*

| Weight in gms. | Carbon Steel | | Nickel (2″ x ¼″ x ⅛″) |
| --- | --- | --- | --- |
| | Freely Corroding Specimen | Protected | |
| Before | 5.3442 | 4.2378 | 10.4301 |
| After | 5.1820 | 4.2316 | 10.4246 |
| Difference | 0.1622 | 0.0062 | 0.0056 |

The protected specimen had been cathodized initially at a voltage of about −0.42 volt to antimony for 9½ hours drawing 60 milliamperes which current was maintained constant, and the deposited antimony film allowed to stand without current application for 12 hours. Total film thickness was 10 mils.

EXAMPLE II

Two identical carbon steel specimens, approximately 1 inch x ¼ inch x ¹⁄₁₆ inch, were tack-welded to 6-inch lengths of nickel wire and immersed in a molten salt (SbCl₃–5% AlCl₃) mixture which had previously been saturated with anhydrous HCl. The glass vessel containing the salt mixture was stoppered by a cork through which the nickel wires penetrated for external electrical contact. Included in the cell was a platinum electrode and a silver/silver chloride reference electrode contained in a separate glass compartment bridged to the solution by a sintered glass disc. The specimens and attached wires were accurately weighed before placing in the solution, which was kept fluid by low heat and were weighed after cleaning at the end of the test. The weight losses, which indicated the extent of attack, are set forth in Table II below.

*Table II*

| Weight | Carbon Steel | |
| --- | --- | --- |
| | Freely Corroding Specimen | Protected |
| Before | 2.9308 | 2.9017 |
| After | 2.7466 | 2.8987 |
| Difference | 0.1842 | 0.0030 |

The protected specimen had been cathodized at a voltage of about −0.20/Ag/AgCl for two hours, and the deposited antimony film allowed to stand without current application for 68 hours.

EXAMPLE III

An electro-deposition protection system was installed in a nickel-clad contactor (54″ ID x 16′–0″) in a butane isomerization plant which used a molten aluminum trichloride-antimony trichloride catalyst system. A steel sacrificial anode (14′–8″ x 3″ OD) was connected directly to the vessel head. Since the steel is less noble than nickel in an aluminum trichloride-antimony trichloride electrolyte, the iron goes into solution and antimony plates out on the nickel surfaces. In order to demonstrate the effectiveness of protection system, two types of specimens were installed in the reactor—(1) nickel specimens coupled directly to the vessel wall, and (2) nickel specimens insulated from the vessel wall. The appreciable decrease in weight loss of the protected specimens that were coupled directly to the vessel wall indicates the effectiveness of this corrosion protection system.

The type of film necessary for efficient protection by the instant corrosion protection system is a continuous adherent antimony film which is plated on the reaction vessel. The character of the film is dependent on both current density and time. The film can vary in thickness from about 0.001 inch to about 0.030 inch and particularly from about 0.005 inch to about 0.010 inch. It is understood of course that the thickness of the film is a function of the size and type of vessel (with respect to interference), the number of electrodes required, and the like.

Under the most favorable conditions, it is preferred that the film of antimony metal is formed over the entire vessel surface prior to starting up the conversion process. After the initial formation of the protective antimony film, the current requirements to maintain the film are lowered and therefore a pulsating system for introducing the current to the vessel is employed. A significant hazard to maintaining a continuous protective antimony film in the vessel is the velocity of the hydrocarbon when it is introduced into the vessel. That is, the motion of the hydrocarbon tends to exert a scouring effect which prevents or breaks down the formation of the antimony coating. Consequently, those areas exposed to such motion require higher current densities. However, the only area in the vessel which is subjected to extreme turbulence with respect to movement of the hydrocarbon is near the base of the vessel where at least one of the anodes is preferably located. Therefore, higher current densities are available in this area.

It is preferred in the practice of the invention that the antimony be plated out over the entire surface of the vessel. That is, at the outset of the protection process, the vessel is completely charged, and the plating out process is carried out in the charged vessel in a virtually hydrodynamically static system thereby depositing a uniform and continuous coating of antimony throughout the vessel. Unless the coating is continuous during the reaction process, localized attack could occur at areas of discontinuity causing pitting of the vessel walls. For example, if the vessel is not charged completely with an electrolyte solution at the outset, and the antimony plated throughout the vessel, there could be corrosive activity at the interface of the liquid and the vapor in the vessel. However, charging the vessel completely and plating out antimony before starting up the conversion process as described above, avoids this problem with respect to interface corrosion.

The current and voltage requirements necessary to achieve and maintain satisfactory protection depend upon a number of variables such as (1) size of the vessel, i.e., height and diameter, (2) the presence of interferences within the vessel, i.e., extending and protruding objects such as baffles, trays and the like, (3) concentration and type of conversion catalyst mixtures employed, (4) rate of throughput of feed, and (5) type of vessel used. For example, in an isomerization process with a tower reactor as described in U.S. Patent 2,983,775, a carbon steel tower having a height of approximately 37 feet and a diameter of about 12 inches would require an initial current of about 600 amps. to plate out a satisfactory antimony layer of about 0.010 inch thick. Thereafter, a pulsating current-voltage requirement of about 60 amps. is required about every 24 hours for a period of about 120 minutes to maintain a satisfactory protective coating during the isomerization process. The amount of current required for a given vessel can be readily determined.

Various detecting devices can be utilized in the instant process to trigger the pulsating current flow when the continuity or thickness of the film falls below that which is considered effective for the purpose of the invention. For example, a potentiostat can be included in the system to trigger the flow of current, thereby effecting an efficient pulsating system with significant savings in current.

The most economically feasible source of energy for the instant corrosion protection system is commercially purchased electric power which is subsequently converted into direct current by means of a rectifier. The conventional apparatus employed for this purpose is actually two devices in one, (1) a transformer to convert the purchased power from 110, 220, or occasionally 440 volts to the much lower voltage needed, and (2) a set of rectifiers to convert this low-voltage alternating current to direct current, and in addition variable resistors to adjust the direct current. The type of rectification and transformer apparatus employed and the type of housing and cooling systems associated therewith can be any conventional equipment known to those skilled in the art.

The type, shape, size, number and relative position of the anode or anodes used in the instant process are determined by the particular vessel employed, the catalyst mixture used, the source of power available, and the like. However, either of the following two methods can be employed to economize current and assure a more even distribution thereof throughout the vessel: (1) several anodes located throughout a vessel which is completely charged with electrolyte may be fed current simultaneously, or (2) each of several anodes located in the vessel partially charged with electrolyte may be fed current at different times. The latter method would require a longer time initially to achieve satisfactory protection of the vessel. In addition a pulsating current system as described previously could also be employed. When employing the pulsating method of introducing current the potential of the surface of the vessel is used as the basis for triggering the current on and off. The requisite potential and approximate time intervals for interrupting the current supply can be determined experimentally for any given vessel. Such an automatic monitoring system could provide constant corrosion protection at a minimum of cost without requiring any direct supervision.

Referring to the drawing; conversion reactor vessel 1 is provided near the bottom thereof with an antimony anode 2. Antimony anode 2 is electrically insulated from vessel 1 by means of insulation zone 3. Electrolyte containing the molten salt catalyst (including antimony halide) is introduced into vessel 1 through line 4 until the level in the vessel reaches discharge line 5. Both lines 4 and 5 are equipped with insulating flanges 6 and 7 respectively to electrically insulate the vessel from the remainder of the conversion processing equipment. Vessel 1 is also equipped with external electrical connections 8 and 9 at opposite ends of the vessel. These connections are electrically connected power supply 10 after passing through a variable resistance means 11 ammeter-voltmeter 12 and rectifier-transformer 13. Anode 2 is electrically connected to power supply 10 through rectifier 13. Current from power supply 10 is introduced to the surface of the vessel by means of external electrical connections 8 and 9. Additional antimony ions are introduced into the electrolyte in vessel 1 (represented by the dotted lines) by means of anode 2. Antimony metal deposits throughout the inner surface of the vessel. When potential shown by 12, with no impressed current, indicates the antimony film is satisfactory, feed containing the hydrocarbons to be converted and the catalyst mixture may be introduced into the vessel by means of line 4. After the conversion reaction is completed the product is withdrawn from the vessel by means of discharge line 5. The reaction is carried out unaffected by the instantly claimed corrosion protection system with a minimum of corrosion occurring throughout the reaction vessel. A potentiostat can be connected to a monitoring system (not shown) to control the current flow.

We claim as our invention:

In a hydrocarbon conversion process employing a molten salt Friedel-Crafts catalyst comprising antimony halide and aluminum halide, wherein the conversion is effected in a metallic vessel, the method of protecting the vessel from corrosion which comprises passing an impressed current from an anode consisting essentially of antimony through the molten salt to the metallic reaction vessel serving as the cathode, thereby releasing antimony ions from the anode to the catalyst and plating out antimony metal on the vessel surface in contact with the catalyst.

References Cited by the Examiner

UNITED STATES PATENTS

| | | | |
|---|---|---|---|
| 476,914 | 6/92 | Bernard | 204—196 |
| 1,527,027 | 2/25 | Dahmen | 204—196 |
| 1,846,765 | 2/32 | Semenity | 204—147 |
| 2,444,174 | 6/48 | Tarr et al. | 204—148 |
| 2,485,276 | 10/49 | Gerbes | 204—196 |
| 2,913,384 | 11/59 | Staley | 204—148 |

FOREIGN PATENTS

| | | |
|---|---|---|
| 657,392 | 9/51 | Great Britain. |
| 825,184 | 12/59 | Great Britain. |

JOHN H. MACK, *Primary Examiner.*

MURRAY TILLMAN, *Examiner.*